(12) United States Patent
Lee et al.

(10) Patent No.: US 8,255,746 B2
(45) Date of Patent: Aug. 28, 2012

(54) COMPUTER SYSTEM AND METHOD EMPLOYING SEPARATE STORAGE AREA FOR COMPUTER PROGRAM RECOVERY

(75) Inventors: Min-hyung Lee, Gyeonggi-do (KR); Deok-rae Kim, Gyeonggi-do (KR); Keon-young Cho, Gyeonggi-do (KR); Seung-lee Nam, Gyeonggi-do (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 12/845,952

(22) Filed: Jul. 29, 2010

(65) Prior Publication Data
US 2011/0055629 A1 Mar. 3, 2011

(30) Foreign Application Priority Data
Aug. 25, 2009 (KR) .................. 10-2009-0078817

(51) Int. Cl.
*G06F 11/00* (2006.01)
(52) U.S. Cl. .................................. 714/38.1
(58) Field of Classification Search .................. None
See application file for complete search history.

(56) References Cited

U.S. PATENT DOCUMENTS

| | | | | |
|---|---|---|---|---|
| 5,657,470 A * | 8/1997 | Fisherman et al. | ........... | 711/153 |
| 5,715,462 A * | 2/1998 | Iwamoto et al. | ............. | 717/173 |
| 6,948,099 B1 * | 9/2005 | Tallam | ....................... | 714/38.14 |
| 7,024,581 B1 * | 4/2006 | Wang et al. | ....................... | 714/2 |
| 7,263,589 B2 * | 8/2007 | Han et al. | ....................... | 711/163 |
| 7,487,367 B2 * | 2/2009 | Belnet et al. | .................. | 713/194 |
| 7,685,474 B2 * | 3/2010 | Viljoen | .......................... | 714/46 |
| 7,979,749 B2 * | 7/2011 | Jann et al. | ..................... | 714/38.1 |
| 2003/0014619 A1 * | 1/2003 | Cheston et al. | .................. | 713/1 |
| 2003/0069999 A1 | 4/2003 | Cheston et al. | | |
| 2004/0019878 A1 * | 1/2004 | Kotnur et al. | ................. | 717/120 |
| 2004/0243759 A1 * | 12/2004 | Itoh et al. | ....................... | 711/112 |
| 2005/0021919 A1 * | 1/2005 | Kroening | ....................... | 711/165 |
| 2006/0248041 A1 * | 11/2006 | Stevenson | .......................... | 707/1 |
| 2008/0005494 A1 * | 1/2008 | Zimmer et al. | ............... | 711/152 |

* cited by examiner

Primary Examiner — Michael Maskulinski
(74) Attorney, Agent, or Firm — Cha & Reiter, LLC (57) ABSTRACT

A computer system, a control method thereof and a recording medium storing a computer program thereof are provided to recover a program efficiently and be resistant to viruses, worms, and user error. The control method of computer system receives a user's request for a recovery of a program which is installed in a first storage unit. A file system of a second storage unit is determined which stores therein a recovery program corresponding to the program for which the recovery is requested. The recovery program is read from the second storage unit with reference to the determined file system, and the program in the first storage unit is recovered by using the read recovery program.

19 Claims, 7 Drawing Sheets

COMPUTER SYSTEM AND METHOD EMPLOYING SEPARATE STORAGE AREA FOR COMPUTER PROGRAM RECOVERY

CLAIM OF PRIORITY

This application claims the benefit of priority from Korean Patent Application No. 10-2009-0078817, filed on Aug. 25, 2009 in the Korean Intellectual Property Office, the disclosure of which is incorporated herein by reference in its entirety.

BACKGROUND OF THE INVENTION

1. Field of the Invention

The present invention relates to recovery software stored in advance in a storage device such as a hard disk drive (HDD) of the computer system. More particularly, the present invention relates to a computer system, a control method thereof and a recording medium storing a computer program thereof which recovers installed software upon an occurrence of an error.

2. Description of the Related Art

A computer system such as a desktop PC, a laptop, notebook, or pad PC uses hardware such as a microprocessor embodied as a central processing unit (CPU), and various software and firmware, such as an operating system (OS), a device driver or an application to perform a given function.

The software of the computer system may sometimes operate abnormally due to various causes such as a virus, a worm, an unintended deletion of a file by mistake, or changes while in operation such as the corruption of a critical file.

In the conventional art for recovering or restoring (hereinafter, "recovering") the software having an error, it has been known that when the software has an error, there is performed an attempted recovery with recovery software provided by a product manufacturer.

The conventional recovery software may be written in a computer readable medium such as a CD or downloaded from a server through a network and then stored on a machine readable medium or in memory accessed by the microprocessor. However, in the aforementioned method, a user may not be able to recover the computer system if the medium storing the recovery software is damaged/corrupted, or if the function of the network of the computer system is not operating normally. Also, even if the recovery function is available, a user may feel inconvenienced to use or keep the medium or to download the recovery software from the network.

To solve the foregoing problem, the recovery software may be stored in advance in a storage device such as a hard disk drive (HDD) of the computer system. However, if access to the storage device such as the HDD is not limited against other applications or users, the recovery software is exposed to virus, hacking or a user's mistake.

SUMMARY OF THE INVENTION

Accordingly, one or more exemplary embodiments of the present invention provide a computer system, a control method thereof and a recording medium storing a computer program thereof which recovers prestored software more efficiently, conveniently and safely than known heretofore.

According to an exemplary aspect of the present invention, there is provided a control method of a computer system, the method comprising: receiving a user's request for a recovery of a program which is installed in a first storage unit; determining a file system of a second storage unit which stores therein a recovery program corresponding to the program for which the recovery is requested; reading the recovery program from the second storage unit with reference to the determined file system; and recovering the program installed in the first storage unit by using the read recovery program.

The method further comprises displaying a list of a plurality of programs which is installed in the first storage unit, and wherein the receiving the user's request comprises selecting at least one program to be recovered from among the plurality of programs on the list.

The determining the file system preferably comprises reading from the second storage unit information on the file system of the second storage unit.

The determining the file system preferably comprises copying to a main memory the information on the read file system.

The method further preferably comprises storing the recovery program in the second storage unit.

According to another exemplary aspect of the present invention, there is provided a computer system, including: a first storage unit which a predetermined program installs therein; a second storage unit which stores a recovery program corresponding to the predetermined program in the first storage unit; a user input unit which receives a user's input; and a controller which determines a file system of the second storage unit according to a user's request with respect to the recovery of the program, reads the recovery program from the second storage unit with reference to the determined file system, and recovers the program installed in the first storage unit by using the read recovery program in the second storage unit.

The computer system further preferably includes a display unit, wherein the controller controls the display unit to display thereon a list of a plurality of programs installed in the first storage unit, and selects at least one program to be recovered from among the plurality of programs.

The controller reads information from a file system of the second storage unit.

The computer system further includes a main memory, wherein the controller copies to the main memory the information read from the file system of the second storage unit.

The computer system further includes an installation unit which stores the recovery program in the second storage unit.

According to still another exemplary aspect of the present invention, there is provided a machine readable medium which stores therein machine executable code of a computer program that is executed by a computer system, the machine readable medium receives a user's request for a recovery of a program which is installed in a first storage unit; determining a file system of a second storage unit which stores therein a recovery program corresponding to a program for which a recovery is requested; reading the recovery program from the second storage unit with reference to the determined file system; and recovering the program installed in the first storage unit by using the read recovery program.

BRIEF DESCRIPTION OF THE DRAWINGS

The above and/or other exemplary aspects of the present invention will become apparent and more readily appreciated from the following description of the exemplary embodiments, taken in conjunction with the accompanying drawings, in which.

DETAILED DESCRIPTION

Below, exemplary embodiments will now be described in detail with reference to accompanying drawings so as to be realized by a person having ordinary skill in the art. The exemplary embodiments may be embodied in various forms, but the presently claimed invention is not limited to the exemplary embodiments set forth herein. Descriptions of well-known structures and functions may omitted for clarity when their inclusion might obscure appreciation of the present invention by a person of ordinary skill in the art, and like reference numerals refer to like elements throughout the specification.

Figure 1:
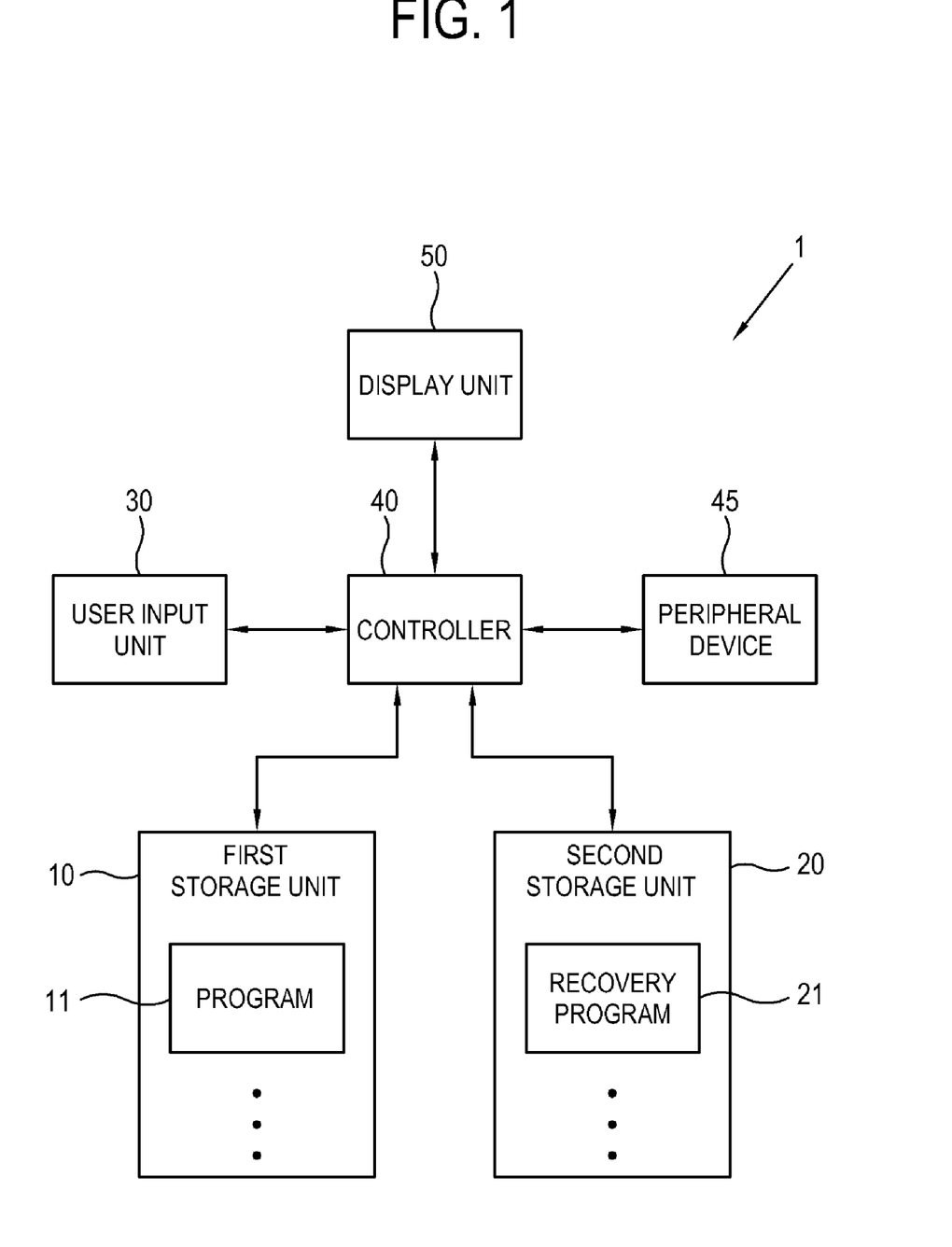
FIG. 1 is a block diagram of a computer system according to an exemplary embodiment of the present invention.

FIG. 1 is a block diagram of a computer system according to an exemplary embodiment of the present invention. A computer system 1 according to the exemplary embodiment includes all devices which are configured as a combination of hardware and software to performs a predetermined function, regardless of its name or form, for example a desktop PC, a laptop PC, notebook PC, netbook PC, pad PC, or an ultra mobile PC (UMPC), just to name a few possibilities.

As shown therein, the computer system 1 according to the exemplary embodiment preferably includes a first storage unit 10, a second storage unit 20, a user input unit 30 and a controller 40.

The first storage unit 10 and the second storage unit 20 are non-volatile memories and continuously store data of the computer system 1. The first storage unit 10 and the second storage unit 20 according to the exemplary embodiment may be configured as hard disk drives, respectively or both of the first storage unit 10 and the second storage unit 20 may be configured as a single HDD 15 (refer to FIG. 6). In the latter case, the first and second storage units 10 and 20 may be divided into partition units and can be referred to a major partition and a hidden partition. According to another exemplary embodiment, other types of storage mediums may also be used. For example, at least one of the first and second storage units 10 and 20 may include a solid state drive (SDD).

The first storage unit 10 stores a program 11 therein. The program 11 according to the exemplary embodiment comprises machine readable executable code. The program 11 includes at least one of a device driver and an application of the computer system 1. The computer system 1 according to the present exemplary embodiment may further include at least one peripheral device 45 corresponding to the device driver. The peripheral device 45 may include, for example a USB memory stick, a USB input/output device, a graphic card, a sound card or a network card, just to name a few possibilities.

The program 11 is preferably stored in the first storage unit 10 to be consistent with the computer system 1 in consideration of an efficient execution. In this particular case, the program 11 is installed in advance. A plurality of programs 11 may be installed in the first storage unit 10. In the first storage unit 10 according to the exemplary embodiment, an operating system 12 of the computer system 1 may also be stored therein (refer to FIGS. 4 and 6).

The second storage unit 20 preferably stores therein a recovery program 21 of the program 11. The recovery program 21 is software which comprises machine readable executable code that is installed subsequently after manufacture and recovers the program 11. A plurality of different recovery programs 21 may be stored in the second storage unit 20.

The first and second storage units 10 and 20 have a special relationship in relation to access to data stored in the storage units 10 and 20 by an application 60 (refer to FIG. 4) or by a user through the operating system 12 of the computer system 1. The first storage unit 10 according to the exemplary embodiment may be freely accessed by the application 60 or user. For example, the first storage unit 10 is recognized as a valid storage device by the operating system 12 of the computer system 1, and is allocated with a character of an inherent drive such as "C" or "D". If the application 60 or a user requests for access to the first storage unit 10 with respect to data, the operating system 12 of the computer system 1 normally performs the access.

Figure 6:
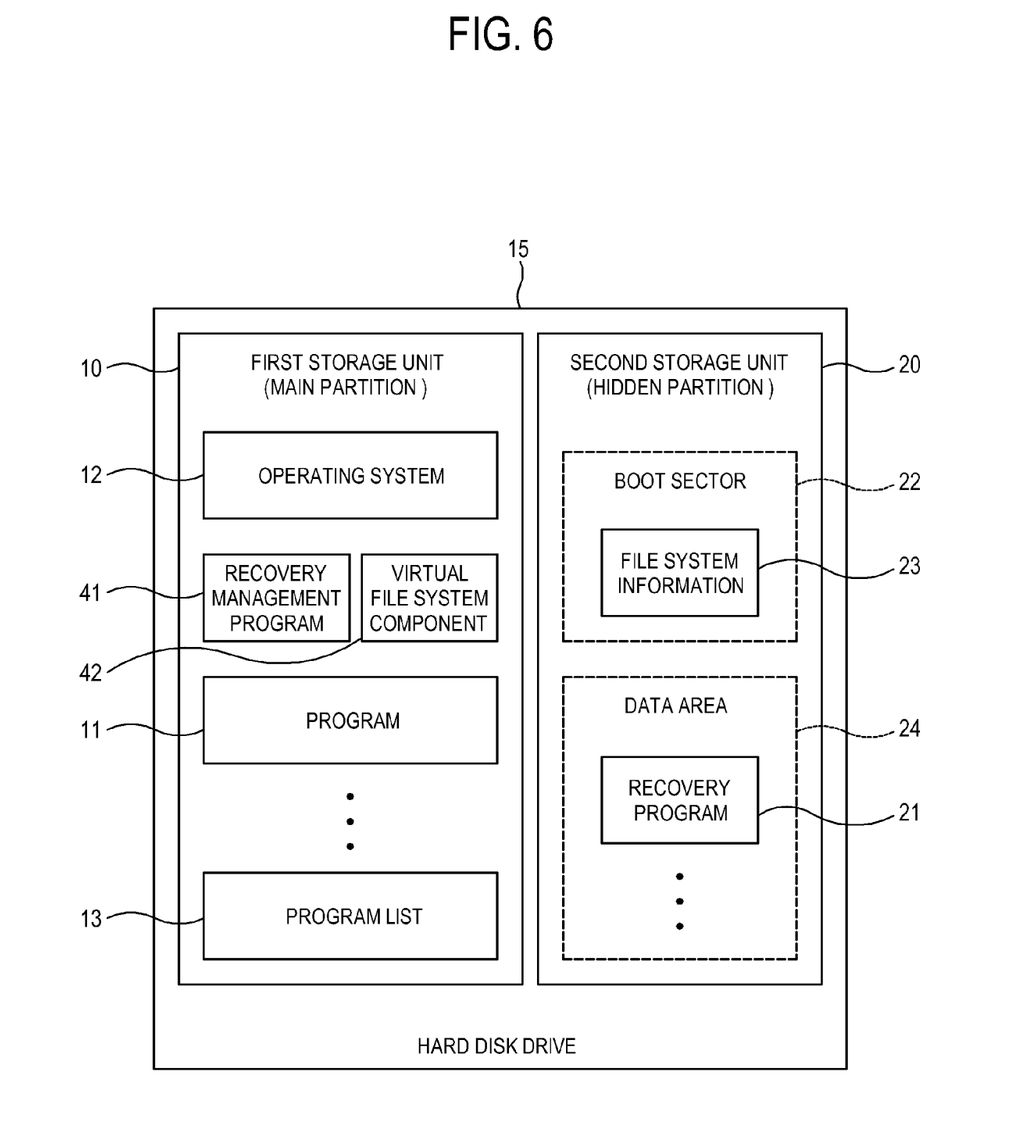
FIG. 6 is a detail block diagram of the computer system according to the exemplary embodiment of the present invention.

Meanwhile, the application 60 (FIG. 4) or the user may not access the data in the second storage unit 20 through the operating system 12. For example, as shown in FIG. 6, the second storage unit 20 is a hidden partition of the HDD 15 and thus the operating system 12 may not recognize the second storage unit 20 as a normal drive. Whether the second storage unit 20 is a hidden partition or not may be determined by a partition table which is included in a master boot record (not shown) as an initial sector of the HDD 15. Information on the partition type of the HDD 15 representing the partition of the second storage unit 20 exists in the partition table of the master boot record of the HDD 15.

In this exemplary embodiment of the present invention, the second storage unit 20 is a hidden partition, and the operating system 12 of the computer system 1 does not recognize the second storage unit 20 as a normal drive and thus does not assign the character of the inherent drive to the second storage unit 20. Even if the application 60 or a user requests for access to the data in the second storage unit 20, the operating system 12 does not normally permit the access. That is, the recovery program 21, which is stored in the second storage unit 20, is not exposed to virus, hacking or a user's mistake and thus its stability is guaranteed.

Referring again to FIG. 1, the user input unit 30 preferably includes a keyboard or a mouse and transmits a user's input to the controller 40.

Figure 2:
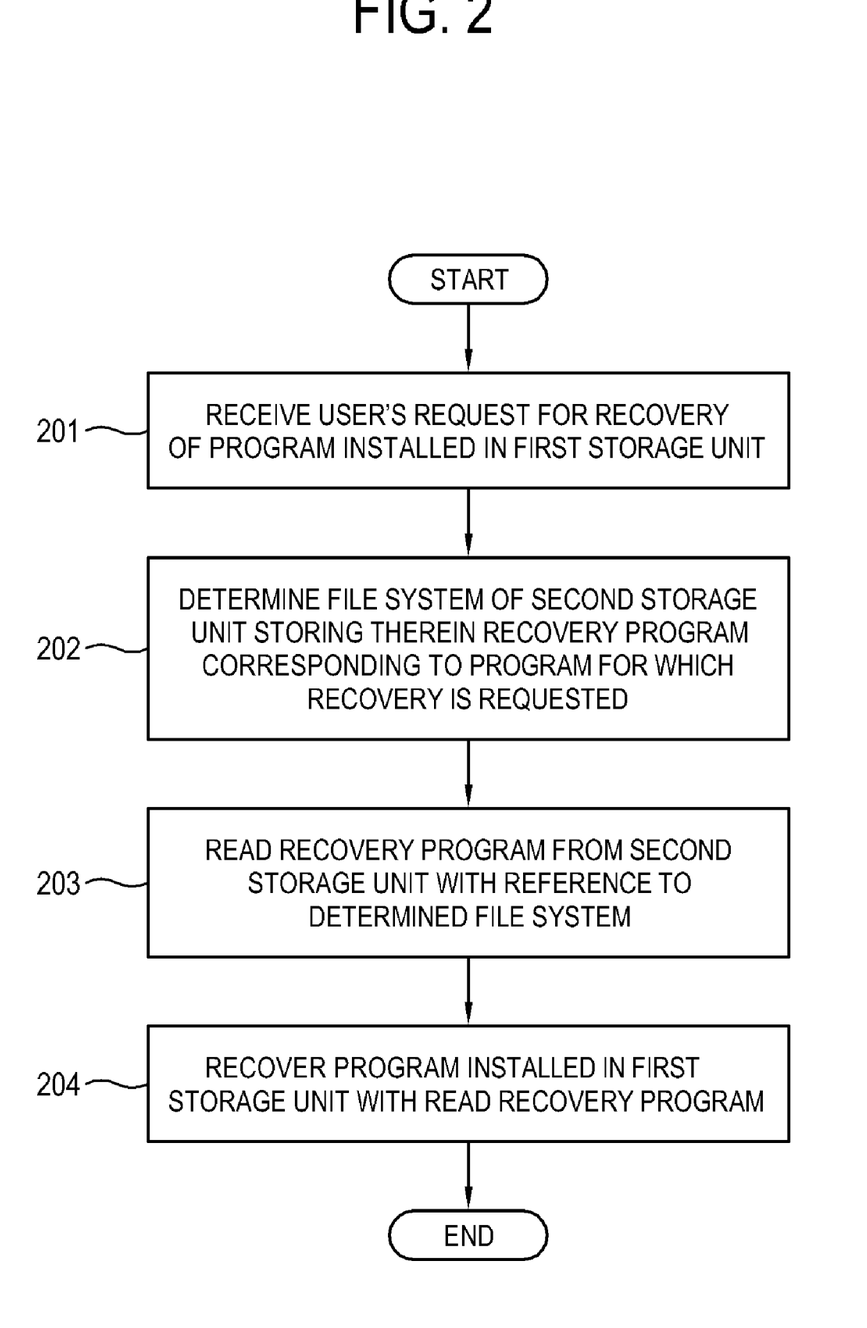
FIG. 2 is a flowchart providing illustration of exemplary operation of a control process of the computer system according to the exemplary embodiment of the present invention.

If a recovery of the program 11 installed in the first storage unit 10 is required, the controller 40 recovers the installed program 11 by using the recovery program 21 stored in the second storage unit 20. For example, the controller 40 executes a recovery management program 41 (refer to FIGS. 4 and 6) loaded into a main memory (not shown) such as a random access memory (RAM) by using a processor (not shown) such as a CPU. Referring to FIG. 2, the controller 40 according to the exemplary embodiment will be described in detail. FIG. 2 is a flowchart of a control process of the controller 40 according to the exemplary embodiment.

Referring now to FIG. 2, at (S201) the controller 40 receives a user's request for the recovery of the program 11 installed in the first storage unit 10 through the user input unit 30. The user's request for the recovery of the program 11 may be made through a user interface (UI) provided by the operating system 12.

For example, in the case of the operating system 12 such as "Windows©", a user may double click an icon of the recovery management program 41 in "Windows Explorer©" through a mouse and initiate the recovery request for the program 11.

Figure 3:
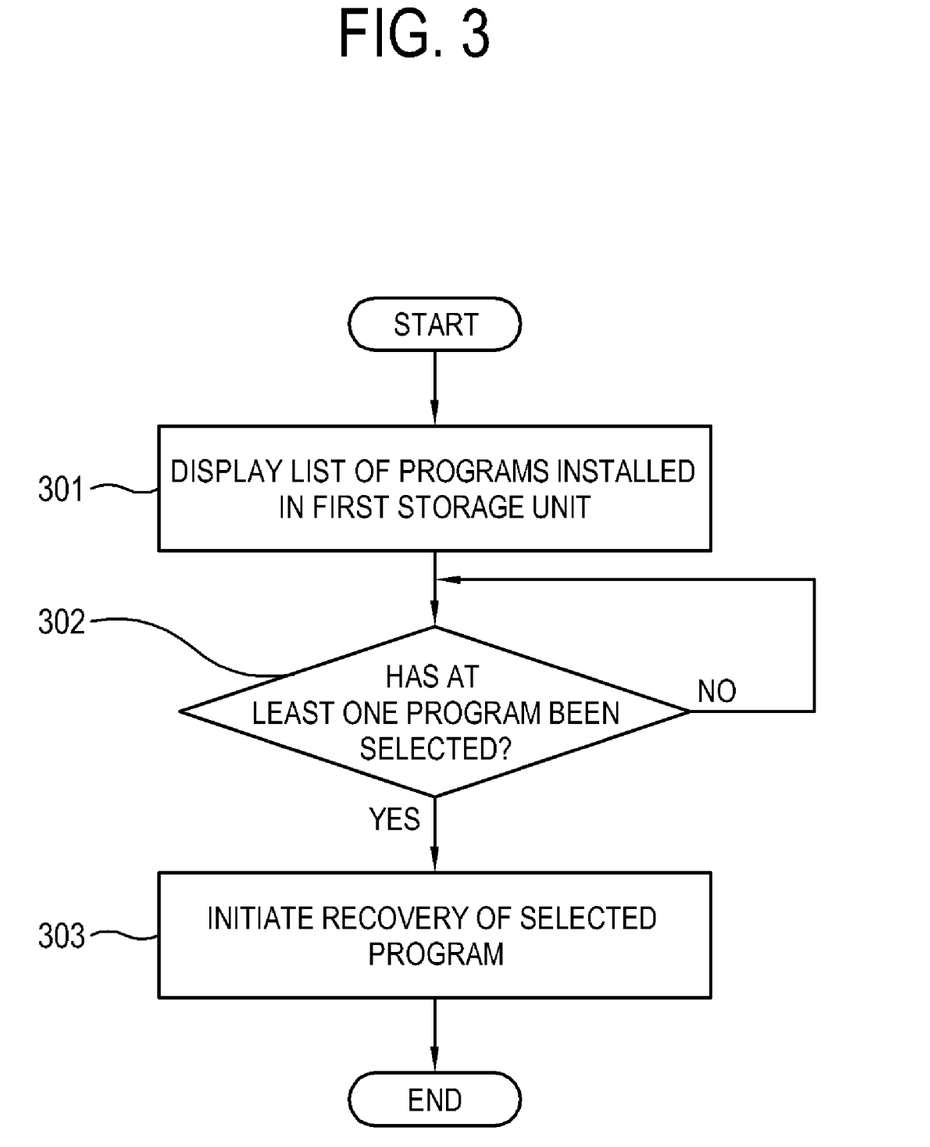
FIG. 3 is a flowchart of an additional control process of the computer system according to the exemplary embodiment of the present invention.

According to another exemplary embodiment, as shown in FIG. 3 at (S301), the controller 40 may display a list of recoverable programs 11 through a UI. To display the list of recoverable programs 11, the computer system 1 according to the exemplary embodiment may further include a display unit 50 such as a liquid crystal display (LCD). As shown in FIG. 6, the controller 40 according to the exemplary embodiment preferably stores a program list 13 which includes information on the list of the recoverable programs 11 in the first storage unit 10 and display the list of the recoverable programs 11 based on the program list 13.

Referring now to FIG. 3, at (S302), the controller 40 determines whether or not at least one of the recoverable programs 11 displayed as a list is selected by a user's input received through the user input unit 30. If a user selects at least one of the programs 11 at operation S302, then at (S303) the controller 40 initiates the recovery of the program 11.

With the display of the list of the recoverable programs 11 and the selection of the program as discussed herein above, a user may recover the preinstalled program 11 more conveniently.

Now referring back to FIG. 2, upon a request at (S201) for the recovery of the program 11, at (S202) the controller 40 determines a file system of the second storage unit 20 storing the recovery program 21 therein that corresponds to the program 11 for which the recovery is requested. In other words, since the operating system 12 of the computer system 1 may not normally have access to the second storage unit 20, the controller 20 accesses the second storage unit 20 through an additional configuration on behalf of the operating system 12. Hereinafter, the access to the second storage unit 20 by the controller 40 will be described in more detail with reference to FIG. 4.

Figure 4:
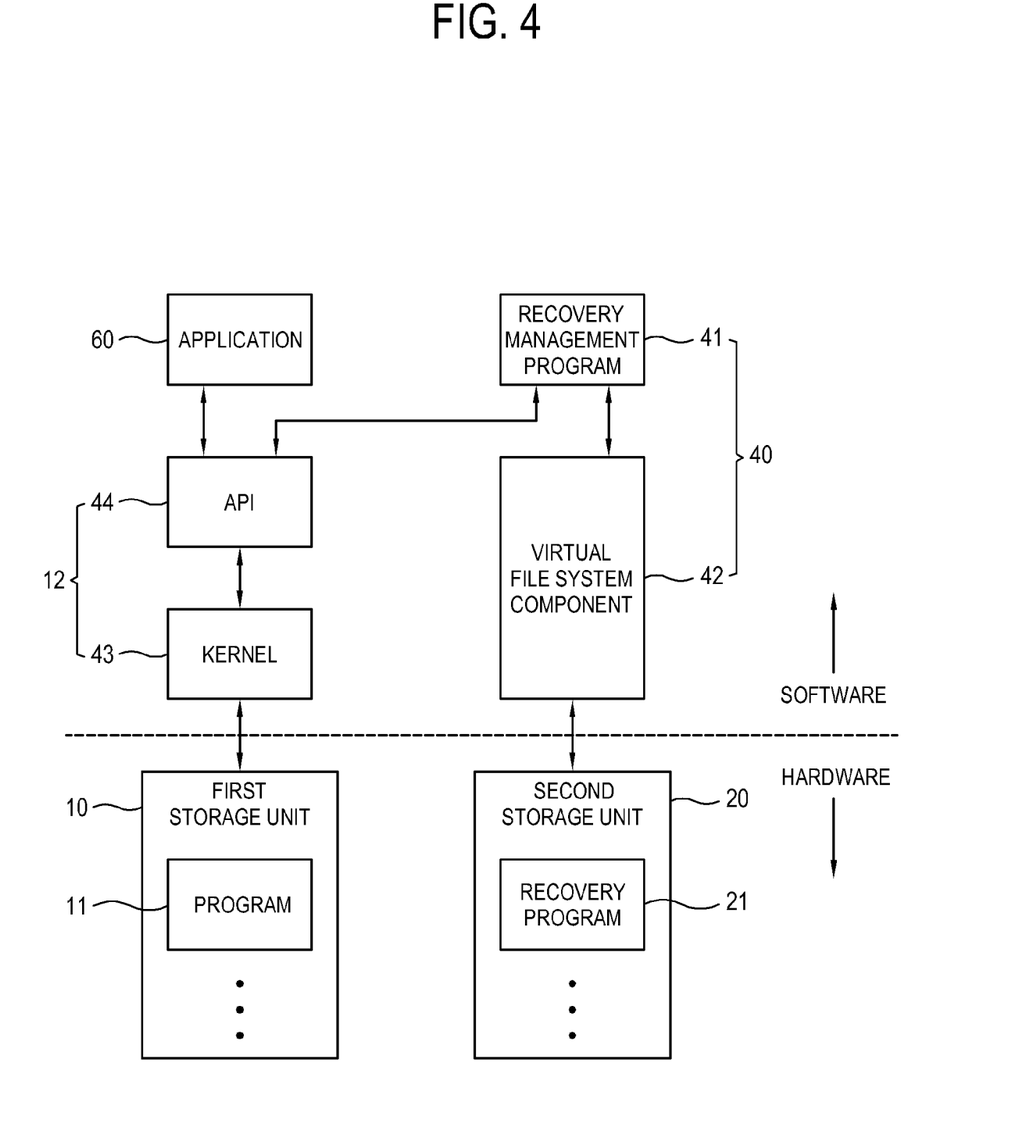
FIG. 4 is a block diagram of hardware and software of the computer system according to the exemplary embodiment of the present invention.

FIG. 4 is a block diagram of hardware and software of the computer system 1 according to the exemplary embodiment of the present invention. The application 60 in FIG. 4 is a voluntary application which is executed by the computer system 1. As shown therein, the operating system 12 of the computer system 1 typically includes a kernel 43 and an application programming interface (API) 44. The kernel is a core of the operating system 12 and provides various basic services with respect to other parts of the operating system 12. The API 44 acts as an interface between the kernel 43 and the application 60, and provides a function for the application 60 to be able to use the service provided by the kernel 43. The application 60 may perform a desired operation by loading the function of the API 44 as necessary. The function according to the exemplary embodiment means a single command or a set thereof which processes information, such as received characters or figures and provides the results.

For example, the application 60 may load a function relating to the file access of the API 44 in order to access the file stored in the first storage unit 10. If the operating system 12 includes "Windows©", the function relating to the file access by the API 44 may be "CreatFile", "ReadFile" or "WriteFile".

In this case, the kernel 43 accesses the file stored in the first storage unit 10 and provides the results to the application 60 in response to the request for the function relating to the file access by the application 60.

As described above, the second storage unit 20 is the hidden partition of the system and thus is not recognized as a normal drive by the operating system 12. Thus, the application 60 may not have access to the file of the second storage unit 20 through the function of the API 44 provided by the operating system 12. That is, the operating system 12 does not recognize the second storage unit 20 as the normal drive and does not provide information on the file system of the second storage unit 20 in the main memory. Thus, the application 60 may not access the file of the second storage unit 20 only through the operating system 12.

In order to access the file of the recovery program 21 stored in the second storage unit 20, the controller 40 according to the exemplary embodiment uses an additional interface which replaces the operating system 12.

With continued reference to FIG. 4, the controller 40 according to the exemplary embodiment includes a recovery management program 41 and a virtual file system component 42. The recovery management program 41 is an application which manages a recovery process of the program 11 as a whole. The virtual file system component 42 provides an interface for an access to the file stored in the second storage unit 20 with respect to the recovery management program 41. That is, the recovery management program 41 loads the function of the virtual file system component 42 to request for the access to the file stored in the second storage unit 20. The virtual file system component 42 accesses the file stored in the second storage unit 20 and provides the recovery management program 41 with the results of the access corresponding to the request for the function for the access to the file. Thus, access to the second storage unit 20 is preferably made through the virtual file system component 42.

Figure 5:
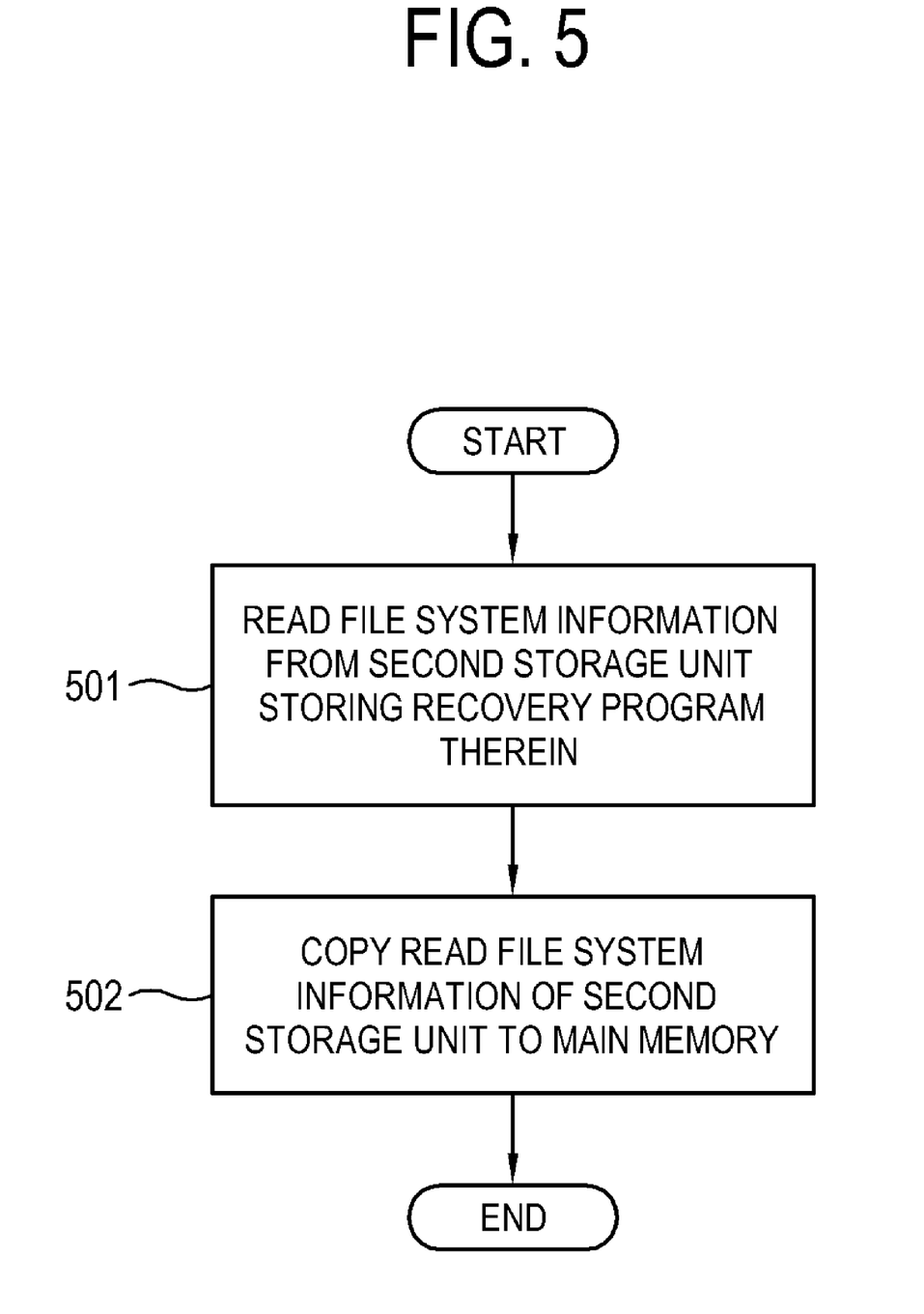
FIG. 5 is a flowchart providing exemplary details of a control process of the computer system according to the exemplary embodiment of the present invention.

Referring now to FIGS. 5 and 6, the virtual file system component 42 according to the exemplary embodiment will be described in more detail. At (S501) in response to the request for the function of the recovery management program 41, the virtual file system component 42 reads file system information 23 from the second storage unit 20 to determine the file system of the second storage unit 20 storing the recovery program 21 therein.

As shown in FIG. 6, the second storage unit 20 according to the exemplary embodiment may include a data area 24 storing the recovery program 21 as a file; and a boot sector 22 having the file system information 23. The boot sector 22 according to the exemplary embodiment is preferably a front section of the hidden partition. The file system information 23 according to the exemplary embodiment includes information on the status of the file system, e.g., the size of the file system or the number of blocks in the file system. The file system information 23 according to the exemplary embodiment may include a file allocation table.

Returning to FIG. 5, at (S502) the virtual file system component 42 according to the exemplary embodiment copies the read file system information 23 of the second storage unit 20 to the main memory. It is efficient to copy to the main memory basic information necessary for the access to the file of the second storage unit 20, such as the file system information 23.

Returning now to FIG. 2, if the file system of the second storage unit 20 is determined at step (S202), i.e., if the file system information 23 of the second storage unit 20 is copied to the main memory, then at (S203) the virtual file system component 42 reads from the second storage unit 20 the recovery program 21 requested by the recovery management program 41 with reference to the file system information 23.

The virtual file system component 42 according to the exemplary embodiment may determine the location of the file of the recovery program 21 from the data area 24 of the second storage unit 20 with reference to the file system information 23.

At step (S204), the recovery management program 41 recovers the program 11 installed in the first storage unit 10 for which a user has requested recovery, by using the read recovery program 21. In more detail, the recovery management program 41 according to the exemplary embodiment may recover the program 11 by reinstalling the program 11 in the second storage unit 10 with the recovery program 21. The recovery management program 41 according to the exemplary embodiment may temporarily store the recovery program 21 read from the second storage unit 20 in a temporary folder to be accessed by the operating system 12 and then remove the recovery program 21 from the temporary folder after the recovery operation of the program 11 is complete.

As described above, the computer system 1 according to the exemplary embodiment may store the recovery program 21 in the second storage unit 20 as the hidden partition not recognized normally by the operating system 12 to thereby protect the recovery program 21 from the access by the application 60 or by a user, and efficiently recover the program 11 utilizing the virtual file system component 42 which accesses the second storage unit 20 on behalf of the operating system 12.

The recovery management program 41 according to the exemplary embodiment may be programmed as an application of the operating system 12 and the execution of the recovery management program 41 and the initiation of the recovery is available by the operating system 12 which is in operation. Thus, a user does not need to shut down the operating system 12 for the recovery and reboot another operating system to access the second storage unit 20.

The recovery program 21 and the file system information 23 of the second storage unit 20 according to the exemplary embodiment may be stored at the time of installing the recovery management program 41. The program may be periodically updated over a network. The virtual file system component 42 according to the exemplary embodiment may also be installed at the time of installing the recovery management program 41.

Figure 7:
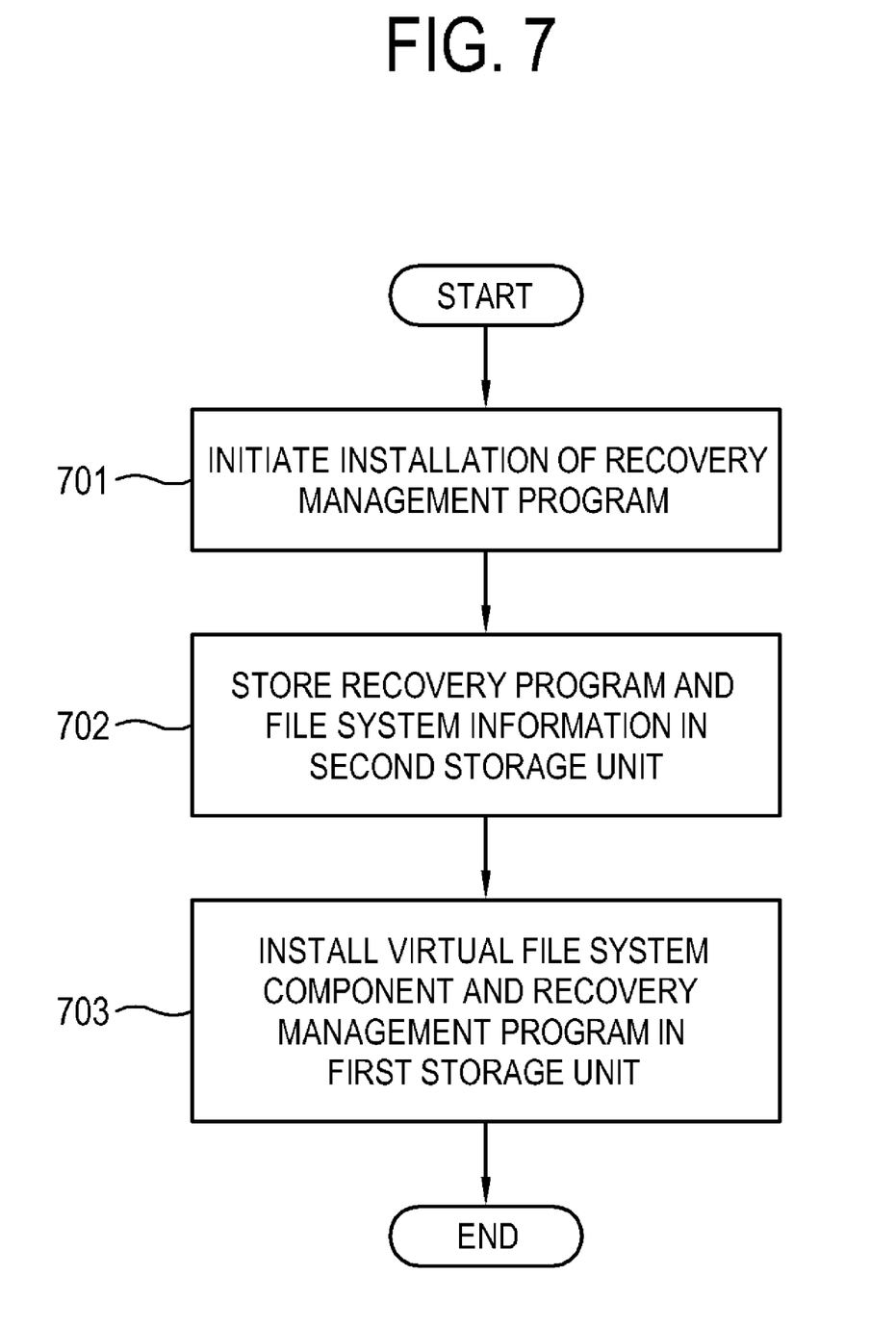
FIG. 7 is a flowchart of an additional control process of the computer system according to the exemplary embodiment of the present invention.

FIG. 7 is a flowchart showing exemplary operation of an installation of the recovery management program 41 according to the exemplary embodiment.

At step (S701), the installation of the recovery management program 41 is initiated by a user's request. According to the present exemplary embodiment, the initiation of installing the recovery management program 41 may be performed by an execution of an installation program (not shown) of the recovery management program 41. The installation program of the recovery management program 41 according to the exemplary embodiment may be stored in the first storage unit 10. The installation program of the recovery management program 41 according to the exemplary embodiment may be copied to the first storage unit 10 from, for example, an optical disk including a compact disc (CD), or a digital versatile disc (DVD), or an external storage device such as a USB memory, or downloaded from a server in a network such as LAN or the Internet to be stored in the first storage unit 10. The optical disk, the external storage device or the storage unit of the server which stores therein the installation program of the recovery management program 41 is an example of a recording medium storing the computer program executed by the computer system 1 according to the exemplary embodiment. The installation program of the recovery management program 41 according to the exemplary embodiment is an example of an installation unit of the computer system 1.

If at (S701) the installation program of the recovery management program 41 is executed, then at (S702) the installation program stores the recovery program 21 and the file system information 23 in the second storage unit 20. At S702, the installation program according to the exemplary embodiment stores the file of the recovery program 21 in a particular sector of the data area of the second storage unit 20 corresponding to the file system information 23.

At (S703), the installation program of the recovery management program 41 according to the exemplary embodiment installs the recovery management program 41 in the first storage unit 10 together with the virtual file system component 42. In a computer system according to another exemplary embodiment, the order of the operation S702 and the operation S703 can be reversed. As described above, the computer system according to the present invention may recover presorted software more efficiently, conveniently and safely.

The above-described methods according to the present invention can be realized in hardware or as software or computer code that can be stored in a machine readable recording medium such as a CD ROM, a RAM, thumbnail drive, a floppy disk, a flash storage, a hard disk, or a magneto-optical disk or downloaded over a network and stored as a non-transitory data on one of the aforementioned mediums, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

For example, the request for recovery of the particular program can be made automatically by the operating system, or in response to a user request. The machine readable medium may comprise a detachable medium attached by the user to a computer system (such as a thumbnail connected to a USB port) when a recovery operation is required.

What is claimed is:

1. A control method of a computer system, the method comprising:
   receiving a request for performing a recovery operation of a particular program which is installed in a first storage unit;
   determining a file system of a second storage unit which stores therein a recovery program corresponding to the particular program for which the recovery operation is requested;
   reading the recovery program from the second storage unit with reference to the determined file system; and recovering operation of the particular program installed in the first storage unit by executing the read recovery program;

wherein access to the second storage unit comprises loading a function of a virtual file system component to request access to the determined file system stored in the second storage unit, wherein the first storage unit comprises a non-hidden partition and the second storage unit comprises a hidden partition, and the recovery program is read from the hidden partition using the virtual file system component which accesses the hidden partition on behalf of an operating system.

2. The method according to claim 1, further comprising displaying a list of a plurality of programs installed in the first storage unit, wherein
the received request includes a selection of at least the particular program to be recovered from among the plurality of programs.

3. The method according to claim 1, wherein the determining the file system includes reading information from the second storage unit regarding the file system of the second storage unit.

4. The method according to claim 3, wherein the determining the file system includes copying to a main memory the information of the file system.

5. The method according to claim 1, wherein the recovery program is stored prior to receiving the request for performing a recovery of the program stored in the first unit.

6. The method according to claim 1, wherein the virtual file system component accesses and provides the determined file system stored in the second storage unit to the recovery program.

7. The method according to claim 1, wherein the recovery program is stored as machine executable code on a detachable computer readable recording medium that is attached to the computer system to initiate a recovery operation.

8. A computer readable recording medium having recorded thereon a program executable by a computer for performing the method of claim 1.

9. The computer readable medium according to claim 8, wherein the recovery program is stored in a temporary folder subsequent to receiving the request for performing a recovery of the program stored in the first unit.

10. The method according to claim 1, wherein the virtual file system component is used to determine location of the recovery program in the hidden partition using information of the file system stored in the second storage unit.

11. A control method of a computer system, the method comprising:
receiving a request for performing a recovery operation of a particular program which is installed in a first storage unit;
determining a file system of a second storage unit which stores therein a recovery program corresponding to the particular program for which the recovery operation is requested;
reading the recovery program from the second storage unit with reference to the determined file system; and
recovering operation of the particular program installed in the first storage unit by executing the read recovery program;
wherein the recovery program is stored in a temporary folder subsequent to receiving the request for performing a recovery of the program stored in the first storage unit,
and wherein the first storage unit comprises a non-hidden partition and the second storage unit comprises a hidden partition, and the recovery program is read from the hidden partition using the virtual file system component which accesses the hidden partition on behalf of an operating system.

12. The control method according to claim 11, wherein the virtual file system component is used to determine location of the recovery program in the hidden partition using information of the file system stored in the second storage unit.

13. A computer system, including:
a first storage unit having a non-hidden partition and a predetermined program comprising machine executable code installed therein;
a second storage unit having a hidden partition stores a recovery program corresponding to a recovery operation for the predetermined program;
an input unit which receives an input; and
a controller which determines a file system of the second storage unit according to a received request with respect to the recovery of the predetermined program, reads the recovery program from the second storage unit with reference to the determined file system, and recovers operation of the predetermined program installed in the first storage unit by executing the read recovery program, wherein access to the second storage unit by the controller comprises loading a function of a virtual file system component to request access to the determined file system stored in the second storage unit, and and the recovery program is read from the hidden partition using the virtual file system component which accesses the hidden partition on behalf of an operating system.

14. The computer system according to claim 13, further including a display unit, wherein the controller controls the display unit to show a list of a plurality of programs installed in the first storage unit, and selects at least one program to be recovered from among the plurality of programs.

15. The computer system according to claim 13, wherein the controller reads information from the second storage unit regarding a file system of the second storage unit.

16. The computer system according to claim 15, further including a main memory, wherein the controller copies to the main memory the information read from the file system.

17. The computer system according to claim 13, further including an installation unit which stores the recovery program in the second storage unit.

18. The computer system according to claim 13, wherein the recovery program is stored in a temporary folder subsequent to receiving the request for performing a recovery of the program stored in the first unit.

19. The system according to claim 13, wherein the virtual file system component is used to determine location of the recovery program in the hidden partition using information of the file system stored in the second storage unit.

* * * * *

UNITED STATES PATENT AND TRADEMARK OFFICE
CERTIFICATE OF CORRECTION

| | | |
|---|---|---|
| PATENT NO. | : 8,255,746 B2 | Page 1 of 1 |
| APPLICATION NO. | : 12/845952 | |
| DATED | : August 28, 2012 | |
| INVENTOR(S) | : Min-hyung Lee et al. | |

It is certified that error appears in the above-identified patent and that said Letters Patent is hereby corrected as shown below:

In the Claims:

Column 9, Claim 3, Lines 19-20 should read as follows:
--...wherein determining the file system...--

Column 9, Claim 4, Lines 23-24 should read as follows:
--...wherein determining the file system...--

Column 10, Claim 13, Line 33 should read as follows:
--...storage unit, and the...--

Signed and Sealed this
Thirtieth Day of April, 2013

Teresa Stanek Rea
*Acting Director of the United States Patent and Trademark Office*